Patented Feb. 24, 1931

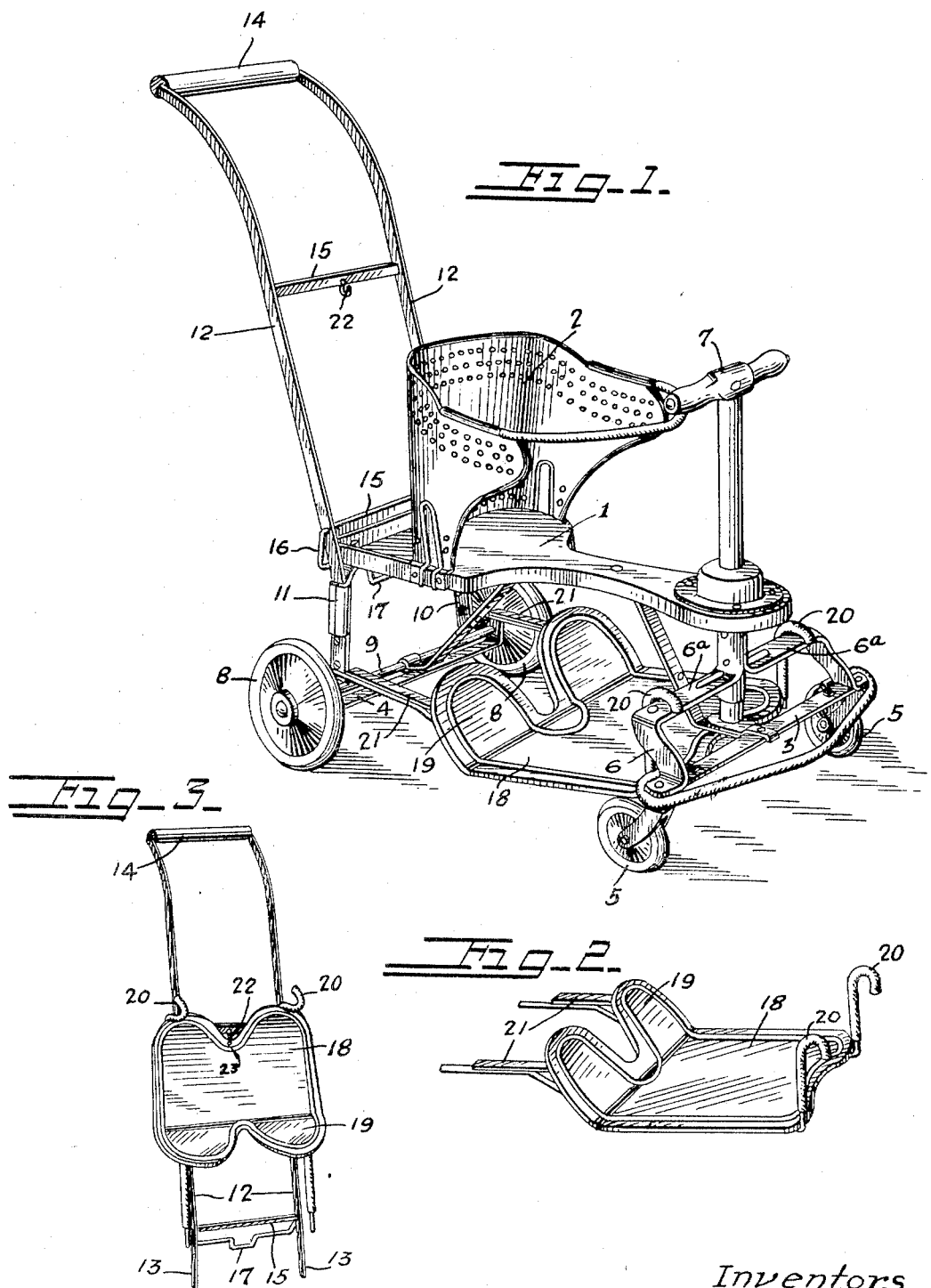

1,793,848

UNITED STATES PATENT OFFICE

DONALD W. GILL, MARK P. ORR, AND FRANK F. TAYLOR, OF NORWOOD, OHIO, ASSIGNORS TO THE FRANK F. TAYLOR COMPANY, OF NORWOOD, OHIO, A CORPORATION OF OHIO

CHILD'S VEHICLE      REISSUED

Application filed February 3, 1927. Serial No. 165,541.

Our invention relates to improvements in children's vehicles and particularly to improvements in baby walker combination vehicles.

It is the object of our invention to provide auxiliary devices for a child's baby walker or play-car by which it can readily be converted into a go-cart or other type of vehicle which may be moved about with a push handle.

A baby walker such as is shown in the illustration usually consists in a saddle board, a retaining device, front and back rolling supports and a handle which may be used for steering or which may be used merely as a support for the child's hands. We do not wish to limit ourselves to the handle and rolling support combination which will be hereinafter described with any particular type of vehicle and have shown the combination in our standard type of baby walker.

Referring to the drawings in which we have shown a preferred arrangement with a baby walker of the type shown in the application of Frank F. Taylor, Serial #745,943:

Figure 1 is a perspective view showing the combination set up in the go-cart arrangement.

Figure 2 is a perspective view of the foot board shown in Figure 1, detached from the vehicle.

Figure 3 is a perspective view of the handle and foot board both removed and connected together in a convenient arrangement for storing in a narrow space or carrying in the hand.

The baby walker with which we have shown our improvements has a saddle board 1 narrowed at the front so that when used as a walker the child's legs may straddle the narrow portion and touch the floor with its feet. The saddle has secured to it a backrest 2 which may be removably mounted if desired. Front and rear rolling supports 3 and 4, respectively, are shown, which in this instance are composed of swiveling caster wheels 5 at the front mounted on a frame having upwardly projecting portions 6 and horizontal portions 6a, to which the steering handle 7 is secured. The type of walker shown does not have what is actually a steering handle although the conventional "kiddy-car" steering handle may be used. At the rear the rolling supports are made up of wheels 8 mounted on an axle 9. Extending upwardly at the rear we have shown the upright supports 10 which extend between the axle 9 and the saddle or seat board. The uprights 10 have channels 11 open at the top which secure the terminals of the push handle. The push handle is composed of side bars 12 with terminals 13, secured together at the top with the handle 14. It will also usually be desirable to reinforce the handle combination with cross bars 15. At the terminal end of the auxiliary handle we have provided a pivoted frame 16 which preferably will have a foot engaging portion 17 at its center so that when it is desired to secure the handle in the walker all that the operator will need to do will be to insert the terminals of the handle in the channels 11 and push with the foot against the portion 17 and it will catch in under the rear extension of the saddle board or some other portion of the vehicle having laterally extending parts.

From the foregoing description of the construction of the handle it will be seen that the bail locks under the rear extension of the straddle board from which position it may be disengaged by inserting the tip of the toe under the bail 16 or the portion 17 and pulling backwardly. With the bail released, the handle may be readily released.

The foot board is formed of a flat plate 18 preferably with rear portions slanting upwardly as indicated at 19 to prevent the possibility of the child dragging its feet on the ground. On account of this construction, it is not necessary to make the foot board as large as would otherwise be required. Extending forwardly from the foot board are the hook shaped pieces 20 which are adapted to hook over the horizontal portions 6a of the front frame. Extending rearwardly from the foot board are the rear supports 21 which preferably are secured against sidewise movement by a sliding engagement with the upright supports 10. We have indicated the rear supports 21 in position in Figure 1 resting on the rear axle 9 but it will be obvious that other cross supports than the axle may also be employed to carry the rear supports 21.

Considering that the walker has been used as a walker it will be a simple matter to convert the vehicle into a stroller or push cart by inserting the rear supports 21 in position between the uprights 10 and then hooking the front hooks over the horizontal members 6a. Conversely when the device has been used for pushing it will be a simple manner to insert the foot under the seat board and withdraw the frame 16 so that the push handle may be removed. Then by elevating the front of the device the hooks may be removed and the rear supports 21 slid backwardly to allow the hooks to clear the front frame and the foot board may be removed.

In Figure 3 we have shown the handle and the foot board connected together by means of a hook 22 secured to the cross brace 15, which engages an eye 23 in the floor board assembly. When the floor board and handle are detached, a convenient way of connecting them together is indicated in Figure 3.

Having thus described our invention what we claim as new and desire to secure by Letters Patent is:

1. In combination with a child's vehicle having front and rear rolling supports and a saddle board which a child may straddle, a detachable foot board provided with means for engaging the front rolling support, said foot board being also provided with means for engaging the rear rolling support, and a detachable handle for said vehicle.

2. In combination with a child's vehicle having front and rear rolling supports and a saddle board which a child may straddle, a detachable foot board provided with means for engaging the front rolling support, said foot board being also provided with means for engaging the rear rolling support, and a detachable handle for said vehicle, said front rolling support having horizontal portions and said means for engaging the front rolling support comprising hook shaped members adapted to hook over said horizontal portions.

3. In combination with a child's vehicle having front and rear rolling supports and a saddle board which a child may straddle, a detachable foot board provided with means for engaging the front rolling support, said foot board being also provided with means for engaging the rear rolling support, and a detachable handle for said vehicle, said rear rolling support having horizontal portions and said means for engaging the rear rolling support comprising members extended substantially horizontally from said foot board.

4. In combination with a child's vehicle having front and rear rolling supports and a straddle board which a child may straddle, a detachable foot board provided with means for forming a hooked engagement with said front rolling support, said rear rolling support having horizontal portions and said foot board provided with means for forming a sliding engagement with said horizontal portions.

5. In combination with a baby walker, an auxiliary foot board provided with means for forming a detachable engagement with said baby walker, an auxiliary handle for use when said foot board is in operative position, and means for connecting said foot board to said auxiliary handle when said board and handle are in detached position.

6. In a child's vehicle, the combination of front and rear running gear, a straddle board laterally restricted a portion of its length for receiving a child's legs depending on either side thereof and a foot board extending substantially the maximum width of the straddle board and substantially the length of its restricted portion, said foot board having a horizontal portion and angularly disposed portion, said angularly disposed portion being directed rearly and upwardly to form a heel plate means.

7. In a child's vehicle, the combination of front and rear running gear, a straddle board laterally restricted a portion of its length for receiving a child's legs depending on either side thereof and a foot board extending substantially the maximum width of the straddle board and substantially the length of its restricted portion, said foot board being detachably mounted fore-and-aft on the respective running gears.

8. In a child's vehicle, the combination of front and rear running gear, a straddle board laterally restricted a portion of its length for receiving a child's legs depending on either side thereof and a foot board extending substantially the maximum width of the straddle board and substantially the length of its restricted portion, said foot board being detachably mounted fore-and-aft on the respective running gears, a part of such detachable mounting comprising hooked extensions for engagement with one of the running gears.

9. In combination with a child's vehicle having front and rear rolling supports, front and rear frame members supported by said rolling supports, a straddle board having a laterally restricted portion for receiving a child's legs depending on either side thereof, a foot board located beneath said straddle board and having a portion located below the restricted portion of the straddle board, and means for supporting the forward and rearward portions of said foot board directly from the frame members whereby the floor board will so support the feet of the child that they cannot touch the floor or be inserted between the floor board and the rest of the vehicle to thereby protect the child's legs and feet from injury.

10. In combination with a child's vehicle having front and rear rolling supports, front and rear frame members supported by said rolling supports, a straddle board having a laterally restricted portion for receiving a child's legs depending on either side thereof, a foot board located beneath said straddle board and having a portion located directly below the restricted portion of the straddle board, and means for connecting the forward and rearward portions of said foot board to said front and rear frame members respectively whereby the floor board will so support the feet of the child that they cannot touch the floor or be inserted between the floor board and the rest of the vehicle to thereby protect the child's legs and feet from injury.

11. In combination with a child's vehicle having front and rear rolling supports, front and rear frame members supported by said rolling supports, a straddle board having a laterally restricted portion for receiving a child's legs depending on either side thereof, a foot board located beneath said straddle board and having a portion located directly below the restricted portion of the foot board, said foot board extending to said front frame member, said foot board having means for attaching the same to at least one of said frame members whereby the foot board will so support the feet of the child that they cannot touch the floor or be inserted between the foot board and the rest of the vehicle to thereby protect the child's legs and feet from injury.

DONALD W. GILL.
MARK P. ORR.
FRANK F. TAYLOR.